T. F. GLENN.
ARTIFICIAL TOOTH.
APPLICATION FILED MAR. 17, 1915.

1,170,630.

Patented Feb. 8, 1916.
2 SHEETS—SHEET 1.

Inventor
Thomas F. Glenn,

By
Clifton C. Hallowell
Attorney

Witnesses
Edward F. Simpson, Jr.
William J. Russell

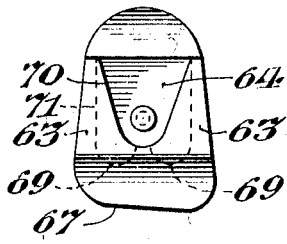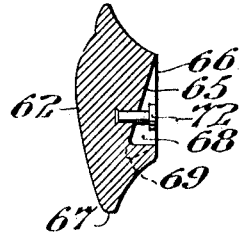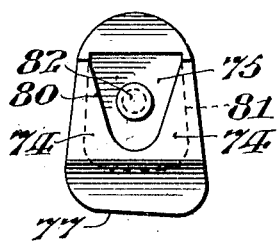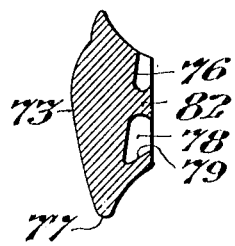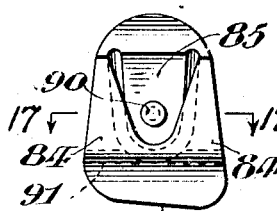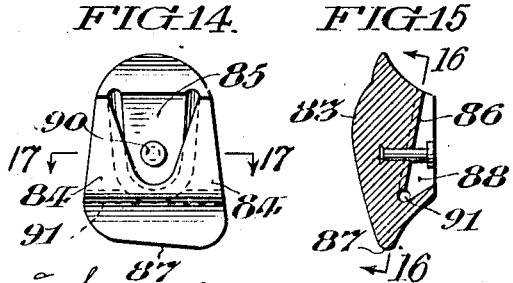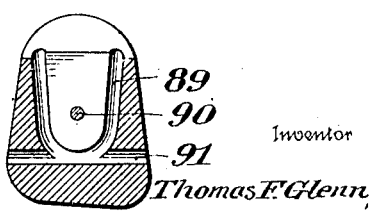

UNITED STATES PATENT OFFICE.

THOMAS F. GLENN, OF ARDMORE, PENNSYLVANIA, ASSIGNOR TO THE S. S. WHITE DENTAL MANUFACTURING COMPANY, A CORPORATION OF PENNSYLVANIA.

ARTIFICIAL TOOTH.

1,170,630.  Specification of Letters Patent.  Patented Feb. 8, 1916.

Application filed March 17, 1915. Serial No. 14,886.

*To all whom it may concern:*

Be it known that I, THOMAS F. GLENN, a citizen of the United States, and a resident of Ardmore, county of Montgomery, State of Pennsylvania, have invented certain new and useful Improvements in Artificial Teeth, of which the following is a specification, reference being had to the accompanying drawings.

My invention relates particularly to that class of artificial teeth which are arranged to be attached to a plate or mounting, and is directed especially to the form of the retention.

The principal objects of my invention are, to provide an artificial tooth that is of simple construction, inexpensive to manufacture, readily connected, and of maximum strength.

Specifically stated, my invention comprises an artificial tooth, preferably formed of porcelain, having a recess in its lingual face forming a pocket which deepens toward its incisive end to form undercut retaining shoulders.

My invention comprehends an artificial tooth having in its lingual face a projection which is embraced upon three sides laterally and incisively by undercut shoulders.

My invention also includes all of the various novel features of construction and arrangement hereinafter more definitely specified.

Figure 1:
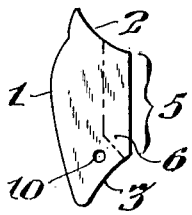
Figure 2:
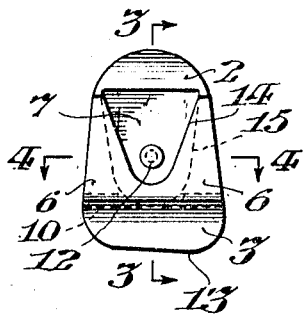
Figure 3:
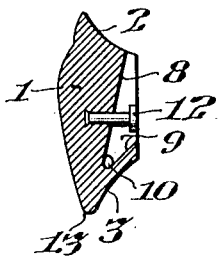
Figure 4:
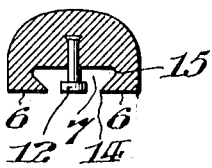
Figure 5:
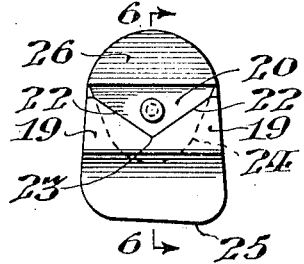
Figure 6:
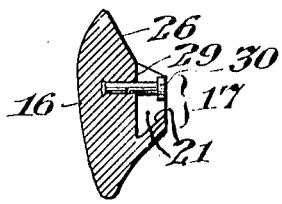
Figure 7:
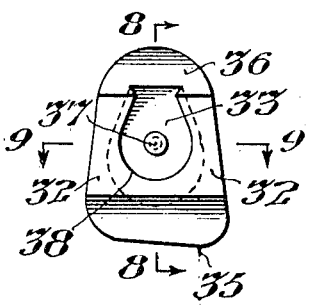
Figure 8:
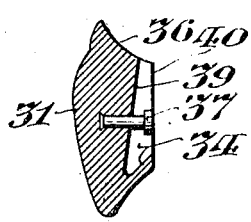
Figure 9:
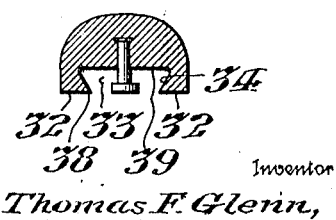

In the accompanying drawings, Figure 1 is a side elevational view of an artificial tooth embodying a convenient form of my invention; Fig. 2 is a rear elevational view of the tooth shown in Fig. 1; Fig. 3 is a vertical longitudinal sectional view, taken through said tooth on the line 3—3 in Fig. 2; Fig. 4 is a transverse horizontal sectional view of said tooth, taken on the line 4—4 in Fig. 2; Fig. 5 is a rear elevational view of a tooth, similar to the tooth shown in Figs. 1 to 4, inclusive, but having a relatively short "shut"; Fig. 6 is a longitudinal sectional view of the tooth shown in Fig. 5, taken on the line 6—6 in said figure; Fig. 7 is a rear elevational view of an artificial tooth embodying a modification of my invention; Fig. 8 is a longitudinal sectional view of the form of tooth shown in Fig. 7, taken on the line 8—8 in said figure; Fig. 9 is a transverse horizontal sectional view of the tooth shown in Figs. 7 and 8, taken on the line 9—9 in Fig. 7; Figs. 10 and 11, 12 and 13, are respectively rear elevational views and corresponding central longitudinal vertical sectional views embodying other modifications of my invention; Fig. 14 is a rear elevational view of an artificial tooth embodying a further modification of my invention; Fig. 15 is a central longitudinal sectional view of the form of my invention shown in Fig. 14; Fig. 16 is a longitudinal sectional view of the tooth shown in Figs. 14 and 15, taken on the line 16—16 in Fig. 15; and Fig. 17 is a transverse horizontal sectional view of the tooth shown in Figs. 14, 15 and 16, taken on the line 17—17 in Fig. 14.

A characteristic feature of my invention may be best described as building upon the perimetric margin of the "shut" of an ordinary form of pin tooth, which not only reinforces and consequently strengthens the tooth body, but affords means for providing retention which has heretofore been provided by pins spaced apart in accordance with the size or shape of the tooth. This feature of my invention I have endeavored to make clear by indicating on Fig. 1 of the drawings a dot and dash line which substantially shows to the left of said dot and dash line a common form of an artificial pin tooth, and to the right of said dot and dash line the extension forming the reinforcement which I have added to produce the desired results.

In the form of my invention shown in Figs. 1 to 4, inclusive, the tooth body 1 having the "ridge-lap" 2 and "bite" 3 has the perimetric margin of the included "shut" 5 extended to provide reinforcements 6 which form the recess 7, having its inner wall 8 preferably inclined labially from the lingual surface of the tooth toward the incisive edge thereof. The boundary walls 9 of the recess 7, included between the edge of the lingual surface of the "shut" 5 and the inner wall 8, are preferably undercut, as best shown in Figs. 3 and 4, to afford retention for the mounting material which may be forced therein, preferably in plastic state.

As shown in Figs. 1, 2 and 3, the tooth may be provided with a transverse aperture 10, extending from side to side of the tooth and preferably cutting into the bottom of the undercut recess 7, which when packed with the mounting material affords a continuous bar of said material extending continuously throughout that portion of the dental arch embodying the artificial teeth, and tying said teeth together in proper alinement. The artificial tooth thus constructed may be provided with further retaining means in the form of a projection extending lingually within said recess 7, and may be in the form of a unitary protuberance composed of the material of which the tooth is formed, or it may be a pin 12 of any suitable material or metal baked or otherwise secured therein, as best shown in Figs. 3 and 4, and, as shown in Fig. 2, said pin 12 is embraced upon three sides laterally and incisively by the undercut shoulders. In this form of my invention, as best shown in Fig. 3, the recess 7 formed by the reinforcing abutments 6 has the edges 14 of its opposite boundary walls, which form shoulders extending in diverging relation gingivally, curvedly connected toward the incisive edge 13 of said tooth. As best shown in Fig. 4, it will be seen that the undercut walls 9 gradually broaden toward the incisive edge 13 of the tooth, so that their inner edges 15 are not parallel with the outer edges but follow more nearly the contour of the tooth body, thus providing a deepening pocket affording the greatest retention toward the incisive edge, where the greatest strain upon the tooth is naturally brought to bear.

The form of my invention shown in Figs. 5 and 6 is embodied in a tooth 16, similar to the tooth shown in Figs. 1 to 4, inclusive, but has a comparatively short "shut" 17. In this form of my invention the reinforcing abutments 19 form a recess 20, whose boundary walls 21 have their lingual edges 22 intersecting at 23 and diverging gingivally, and their labial edges 24 curvedly connected toward the incisive edge 25 and terminating in the "ridge-lap" 26. In this form of my invention I have shown the inner wall 29 of the recess 20 as extending substantially parallel with the lingual surface of the tooth forming the "shut" 17, although it may be disposed relatively angular thereto. This form of my invention may embody, if desired, a pin or projection 30 similar to the pin or projection 12 in the form of tooth described in Figs. 1 to 4, inclusive.

In the form of my invention shown in Figs. 7 to 9, inclusive, the tooth 31 is provided with reinforcing abutments 32 forming the recess 33, whose boundary walls 34 are curvedly connected in divergent relation toward the incisive edge 35 of the tooth and terminate gingivally in the "ridge-lap" 36. As best shown in Figs. 7 and 8, the boundary walls of the recess increase in width toward the incisive edge 35, and afford the greatest retention at the region of greatest strain on the tooth. This form of my invention may include the pin or projection 37, preferably disposed in concentric relation to the lingual edge 38 of the boundary walls 34 of the recess 33, which, as shown in Fig. 8, preferably has its labial wall 39 extending inwardly from the lingual surface 40 toward the incisive edge 35.

The form of my invention shown in Figs. 10 and 11 is embodied in a tooth 62 having the reinforcing abutments 63 forming the recess 64, whose inner wall 65 extends substantially from the upper edge of the lingual surface forming the "shut" 66, inwardly toward the incisive edge 67 of said tooth, and has its lateral boundary walls 68 terminating in separate pockets 69 toward the incisive edge 67. The lingual edges 70 of the recess 64 are curvedly connected toward the incisive edge 67 and diverge gingivally, while the labial edges 71 extend in substantially parallel relation to each other and merge into the separate curved pockets 69. This form of my invention may include a pin or projection 72 extending lingually in the recess 64.

The form of my invention shown in Figs. 12 and 13 is embodied in a tooth 73 having the reinforcing abutments 74 forming the recess 75, whose inner wall 76 slopes inwardly toward the incisive edge 77 and whose lateral boundary walls 78 merge into the transverse boundary wall 79. The lingual edges 80 of the boundary walls are curvedly connected and preferably diverge gingivally, while the labial edges 81 of said boundary walls diverge toward the incisive edge 77. In this form of my invention I have shown the projection 82, which may extend lingually in the recess 75, and preferably be undercut as shown, to afford additional retention, as being formed of the tooth material and in unitary relation with the body of the tooth 73.

The form of my invention shown in Figs. 14 to 17, inclusive, is embodied in the tooth 83, whose reinforcing abutments 84 form the recess 85, whose inner wall 86 preferably slopes inwardly toward the incisive edge 87, and whose boundary walls 88 are curvedly connected and diverge gingivally and gradually broaden toward the incisive edge 87. The inner wall 86 of the recess 85 may be provided with counter-recesses 89, which preferably follow the edge formed by the intersection of the inner wall 86 and boundary walls 88 of said recess. In this form of my invention I have shown a transverse aperture 91 extending from side to side of the tooth and merging into the recess 89, and preferably having its axis tangential to the axis of the recess 89 as it curves toward the incisive edge 87 of the tooth. This form of my invention may also include a projection 90 extending lingually in said recess 85.

Although I have shown a variety of forms, it will be noted that each of said forms shown embodies the principal feature of my invention, which, as above stated, is for the purpose of providing retaining means between the tooth and mounting, which is most effective toward the incisive edge and which is formed in the tooth body and in unitary relation therewith, and although I have shown in but one form a projection in the recess which is formed in unitary relation with the tooth body, for providing additional retention, it is to be understood that any form of tooth embodying my invention may have this projection composed of the tooth material and formed in unitary relation therewith, or said projection may be formed of a different material or metal, either baked in the tooth body or connected thereto, in any desired manner.

It is further understood that although I have shown in but two forms of my invention a transverse aperture extending through the tooth body, this transverse aperture may be included in any form of my invention, and may be disposed in variable relation with respect to the walls of the recess formed therein.

It will be seen that not only may the maximum retention be obtained by forming a tooth in accordance with my invention, but the tooth itself is greatly strengthened by this means of retention, which may be greatly increased by the use of a single pin or projection disposed within the recess forming the retention.

It may be here noted that while the appended claims refer specifically to the tooth as being adapted for vulcanite work, it is to be understood that they are not to be construed as being so limited, as such a tooth may obviously be engaged with plates or suitable mountings formed of plastic material other than vulcanite rubber, which may be baked therein.

It will be obvious that many other forms of tooth may be made by curving in convex or concave form the inner wall of the recesses shown in the teeth, and that this curve may extend either longitudinally or laterally, and that many other shapes of recess may be devised to produce a tooth having the characteristics of my invention, and, therefore, I do not desire to limit my invention to the precise details of construction and arrangement herein specified, as it is obvious that various modifications may be made therein without departing from the essential features of my invention as defined in the appended claims.

Having thus described my invention, I claim:

1. A tooth adapted for vulcanite work, having in its lingual face a recess forming a pocket which deepens toward the incisive end, and whose lingual wall forms incisively and laterally disposed undercut shoulders.

2. A tooth adapted for vulcanite work, having incisively and laterally disposed perimetric shoulders forming a recess providing surfaces which are extended labially beyond the labial wall of said recess to form a groove at the intersection of said surfaces with said labial wall.

3. A tooth adapted for vulcanite work, having incisively and laterally disposed perimetric shoulders, forming a recess providing undercut surfaces which are extended labially beyond the labial wall of said recess to form a counter recess in said labial wall at the intersection of said undercut surfaces with said labial wall, and having a transverse aperture cutting into said groove.

4. A tooth adapted for vulcanite work, having a projection extending from its lingual face embraced upon three sides laterally and incisively by undercut shoulders.

In witness whereof, I have hereunto set my hand this 16th day of March, A. D., 1915.

THOMAS F. GLENN.

Witnesses:
WILLIAM J. RUSSELL,
CLIFTON C. HALLOWELL.

It is hereby certified that in Letters Patent No. 1,170,630, granted February 8, 1916, upon the application of Thomas F. Glenn, of Ardmore, Pennsylvania, for an improvement in "Artificial Teeth," errors appear in the printed specification requiring correction as follows: Page 2, line 17, for the abbreviation and numeral "Fig. 3" read *Fig. 2;* same page, line 23, for "Fig. 4" read *Fig. 2;* same page, the sentences commencing on lines 4, 15, and 22 should appear as paragraphs; and that the said Letters Patent should be read with these corrections therein that the same may conform to the record of the case in the Patent Office.

Signed and sealed this 29th day of February, A. D., 1916.

[SEAL.]

R. F. WHITEHEAD,

*Acting Commissioner of Patents.*

Cl. 32—9.